Dec. 3, 1957 A. B. KAUFMAN 2,815,487

SIGNAL CONVERTER

Filed June 11, 1953

INVENTOR:
Alvin B. Kaufman

By Herbert E. Metcalf
His Patent Attorneys 2,815,487

SIGNAL CONVERTER

Alvin B. Kaufman, Los Angeles, Calif., assignor to Northrop Aircraft, Inc., Hawthorne, Calif., a corporation of California Application June 11, 1953, Serial No. 360,940

3 Claims. (Cl. 332—3)

My invention relates to signal converters, and more particularly to a means for converting a slowly varying signal to an alternating signal suitable for amplification in amplifiers of the alternating current type.

Among the objects of my invention are:

To provide a simple means for converting a slowly varying output voltage to an alternating signal.

To provide a signal converter having a high input impedance adapted for use with low to medium impedance devices developing an output voltage.

And to provide a signal converting circuit utilizing the characteristic properties of photodiodes of the semi-conductor type.

In brief, my invention includes the positioning of a photodiode of the semi-conductor type, such as a germanium photodiode for example, in the output line of a medium to low impedance device such as a thermocouple, this line then being connected to an amplifier of the A. C. type. The photodiode is then illuminated with light varying cyclically at a frequency suitable for amplification by the amplifier and which produces a satisfactory carrier frequency. The photodiode may be in series with the line, in parallel therewith, or both. As the effective back resistance of the photodiode changes only in accordance with illumination, the signals from the source device are efficiently and proportionally converted for proper amplification in amplifiers of the A. C. type.

My invention will be more readily understood by reference to the drawings in which.

Figure 1:
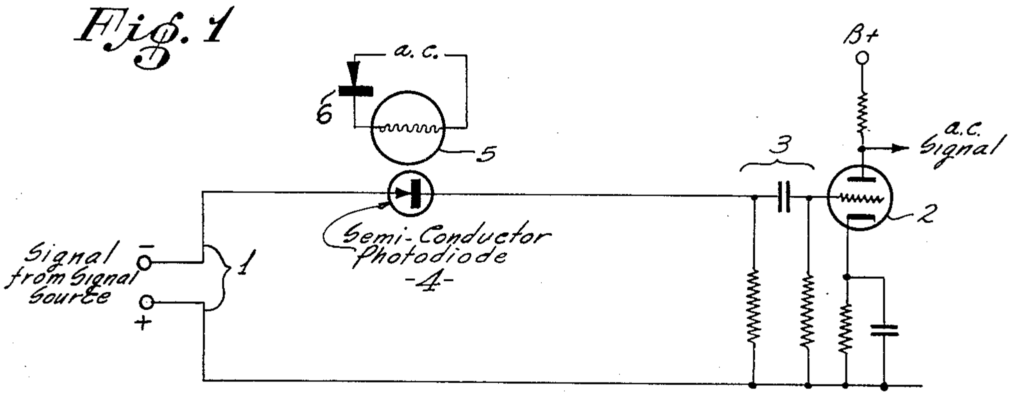
Figure 1 is a diagram showing a series circuit utilizing the present invention.

Referring first to Figure 1, a unidirectional signal, usually of the slowly varying type, is taken from a signal source such as a thermocouple, photoelectric cell, or similar low to medium impedance device developing a voltage, through signal line 1. This line is connected to a grid of the first vacuum tube 2 of an A. C. amplifier through the usual resistance-capacitance network 3. A photodiode 4 is connected in series in the signal line 1 so as to oppose the flow of current. A lamp 5, preferably of the tungsten type, is positioned to illuminate the photodiode, and the lamp is energized by A. C. so that the illumination of the photodiode is cyclically varied at a frequency that is efficiently handled by the A. C. amplifier tube 2. A suitable photodiode is type 1N77 manufactured by Sylvania Electric Company, for example, and lamp 5 can be of the tungsten filament type, as this type of lamp has substantial variation of light during each energizing cycle.

Rectifier 6 can be considered omitted from the circuit for the present. With this embodiment, the A. C. output signal is at twice the lamp excitation frequency since each half alternation of lamp frequency will cause lamp 5 to produce an increase of light. The addition of a rectifier 6 in series with lamp 5 will allow the lamp 5 to light only for one half of a cycle and thereby cause the converter to produce an output voltage at line (lamp excitation) frequency. Another method to secure carrier frequency is to bias the lamp 5 to some particular brightness, allowing the A. C. exciting source to increase or decrease this brightness at a line frequency.

Converter output at much higher efficiencies is secured at line frequency by using a rectifier 6 placed in series with lamp 5 since the lamp is permitted to cool thermally every other half cycle and can thus produce a greater variation of light when it is energized on the other half cycle. Lamps with fine filament strands produce the best fluctuations of light intensity and are preferred with A. C. operation at a double line frequency output, for example. Within certain limits, lamps with a heavy filament and therefore a high thermal inertia should be restricted to operation at line frequency. Lamp 5 is preferably of the tungsten filament type although lamps of the gaseous conduction type (neon, for example) are entirely satisfactory even though the signal output is somewhat lower, and can be used instead. High tension fluorescent tube type lamps can also be used but care must be exercised to shield the electrostatic fields which are produced with their operation from influencing the actual results.

Figure 2:
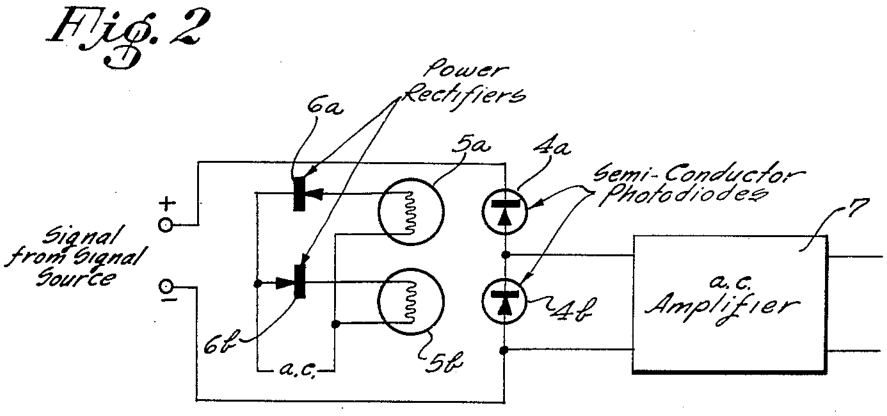
Figure 2 is a diagram showing two photodiodes in a circuit connecting a signal source to amplifier of the A. C. type.

In Figure 2 I have shown a circuit wherein signal line 1 is provided with the series photodiode **4*a* and in addition with a parallel located photodiode 4*b*** of the same type.

Series photodiode **4*a* is illuminated by a first lamp 5*a* and parallel photodiode 4*b* is illuminated by a second lamp 5*b*, these lamps being operated 180° out of phase, each lamp being alternately on for a half cycle. The insertion of a rectifier 6*a* in the power line as shown in Figure 2 allows first lamp 5*a* to be energized for one half of a cycle only, and reversed rectifier 6*b* inserted in the power line as shown allows second lamp 5*b* to be energized for the other half cycle only. By the use of this circuit, the resistance of one photodiode is made to be high when the other is low, thereby substantially increasing the signal passed to the amplifier 7 from the source by increasing the variation of circuit resistance. At the same time this circuit extends the allowable input range of voltage. This is accomplished by parallel photodiode 4*b* maintaining approximately the same resistance as series photodiode 4*a* over a wide range of input voltage thereby yielding optimum load conditions. In the single photodiode circuit (Figure 1), optimum load requirements change as photodiode 4** resistance shifts with input voltage and since the change cannot be compensated herein, this limits the range of input voltage.

Selenium photocells of higher light sensitivity can be used in place of the example germanium photodiodes in either preferred circuits. In this case less power is required for lamp excitation and operation has been highly satisfactory. The lowest value of D. C. signal input that could be applied, however, and still obtain an adequate signal to noise ratio is primarily limited by photo-electric effect in selenium cells. It should also be noted another method of converter operation can be made with steady state light which can be interrupted by mechanical means. Under certain circumstances this method of operation may be desirable.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Means for converting a varying unidirectional input signal to an alternating signal varying in proportion to the variations of said input signal and suitable for amplification in an A. C. amplifier comprising a signal line, a first photodiode of the semi-conductor type positioned in series in said signal line, said diode being oriented to pass signals through said line, an amplifier tube, said signal line being connected to energize said tube, a second photodiode of the semi-conductor type positioned across said signal line at the amplifier tube input, and means for illuminating each photodiode respectively on alternate half cycles with light varying at a substantially constant frequency.

2. Means for converting a varying unidirectional input signal to an alternating signal varying in proportion to the variations of said input signal and suitable for amplification in an A. C. amplifier comprising a signal line, a first photodiode of the semi-conductor type connected in series in said signal line, said diode being oriented to pass said input signal potential through said line, an amplifier tube, said signal line being connected to energize said tube, a first light source positioned to illuminate said first photodiode, a substantially constant frequency A. C. source, a first rectifier connecting said first light source with said A. C. source to excite said first light source on first half cycles, a second photodiode of the semi-conductor type positioned across said signal line at the amplifier tube input, a second light source positioned to illuminate said second photodiode, and a second rectifier oriented in reverse polarity to said first rectifier connecting said second light source with said A. C. source to excite said second light source on second half cycles.

3. Apparatus in accordance with claim 2 wherein said first and second light sources are filament type lamps.

References Cited in the file of this patent

UNITED STATES PATENTS

| | | |
|---|---|---|
| 1,563,557 | Coblentz | Dec. 1, 1925 |
| 2,302,049 | Parker et al. | Nov. 17, 1942 |
| 2,364,483 | Side | Dec. 5, 1944 |
| 2,560,606 | Shive | July 17, 1951 |
| 2,582,850 | Rose | Jan. 15, 1952 |
| 2,668,940 | McNaney | Feb. 9, 1954 |
| 2,669,635 | Pfann | Feb. 16, 1954 |
| 2,670,441 | McKay | Feb. 23, 1954 |